United States Patent
Abuelsaad et al.

(10) Patent No.: US 9,085,269 B2
(45) Date of Patent: Jul. 21, 2015

(54) DETECT DRIVER PERSONA IN A VEHICLE

(71) Applicant: International Business Machines Corporation, Armonk, NY (US)

(72) Inventors: Tamer E. Abuelsaad, Somers, NY (US); David Harrison, Patterson, NY (US); Brent Hodges, Raleigh, NC (US); John Elbert Moore, Jr., Brownsburg, IN (US)

(73) Assignee: International Business Machines Corporation, Armonk, NY (US)

( * ) Notice: Subject to any disclaimer, the term of this patent is extended or adjusted under 35 U.S.C. 154(b) by 1 day.

(21) Appl. No.: 13/895,835

(22) Filed: May 16, 2013

(65) Prior Publication Data

US 2014/0343796 A1 Nov. 20, 2014

(51) Int. Cl.
 *B60R 21/207* (2006.01)
 *B60R 16/037* (2006.01)
 *B60R 21/015* (2006.01)

(52) U.S. Cl.
 CPC ......... *B60R 16/037* (2013.01); *B60R 21/01516* (2014.10)

(58) Field of Classification Search
 CPC .................................................. B60R 21/015
 See application file for complete search history.

(56) References Cited

U.S. PATENT DOCUMENTS

| | | | |
|---|---|---|---|
| 7,019,623 B2 * | 3/2006 | Klausner et al. ........... | 340/425.5 |
| 7,602,947 B1 | 10/2009 | Lemelson et al. | |
| 7,734,072 B2 | 6/2010 | Yamaguchi | |
| 7,864,029 B2 | 1/2011 | Huang et al. | |
| 7,876,201 B2 | 1/2011 | Bauchot et al. | |
| 8,287,055 B2 | 10/2012 | Lee | |
| 8,437,919 B2 * | 5/2013 | Wang et al. ..................... | 701/49 |
| 2007/0219675 A1 | 9/2007 | Uchida et al. | |
| 2010/0066513 A1 | 3/2010 | Bauchot et al. | |

OTHER PUBLICATIONS

Chen, Ronghua, Driver verification based on handgrip recognition on steering wheel, retrieved from ieeexplore.ieee.org on Apr. 19, 2013.
Acura, News & Views, retrieved from www.honda.com on Apr. 19, 2013.
Wahab et al., Driver recognition system using FNN and statistical methods.
Nosowitz, Dan, A car seat that authenticates the driver with butt recognition, retrieved from www.popsci.com on Apr. 19, 2013.

* cited by examiner

*Primary Examiner* — Thomas G Black
*Assistant Examiner* — Ana Thomas
(74) *Attorney, Agent, or Firm* — Cahn & Samuels, LLP

(57) ABSTRACT

An embodiment of the invention provides a method and system for detecting driver persona in a vehicle wherein an attribute of a user is identified via at least one sensor in the interior of the vehicle. The attribute of the user can include the body weight of the user and/or a sequence of activities performed by the user when entering the vehicle. An electronic storage device is queried with the attribute of the user to determine whether the attribute of the user matches a stored driver attribute. The electronic storage device includes one or more driver profiles that include one or more driver attributes and stored driver settings. Driver settings are set in the vehicle with a processor based on the stored driver settings when the attribute of the user matches a stored driver attribute in the electronic storage device.

20 Claims, 5 Drawing Sheets

DETECT DRIVER PERSONA IN A VEHICLE

BACKGROUND

The present invention is in the field of systems, methods, and computer program products for detecting driver persona in a vehicle.

Motor vehicles are often shared amongst multiple individuals, such as family members or co-workers. Typically, each individual operator of the motor vehicle must customize various driver settings based on, for example, the individual's height, arm length, peripheral vision, and personal preferences. The driver settings are typically changed manually, and can include settings such as seat position, rear view mirror position, side mirror position, steering wheel position, and the like.

SUMMARY OF THE INVENTION

An embodiment of the invention provides a method and system for detecting driver persona in a vehicle wherein an attribute of a user is identified via at least one sensor in the interior of the vehicle. The attribute of the user can include the body weight of the user and/or a sequence of activities performed by the user when entering the vehicle. An electronic storage device is queried with the attribute of the user to determine whether the attribute of the user matches a stored driver attribute. The electronic storage device includes one or more driver profiles that include one or more driver attributes and stored driver settings. Driver settings are set in the vehicle with a processor based on the stored driver settings when the attribute of the user matches a stored driver attribute in the electronic storage device.

BRIEF DESCRIPTION OF THE SEVERAL VIEWS OF THE DRAWINGS

The present invention is described with reference to the accompanying drawings. In the drawings, like reference numbers indicate identical or functionally similar elements.

DETAILED DESCRIPTION

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

At least one embodiment of the invention provides a system and method for identifying a driver by a set of attributes and configuring a vehicle based on previous vehicle settings selected by the driver. For example, body mass and biometric data can be used to identify the driver and adjustments to vehicle settings, such as mirror setup, seat position, and temperature, can be performed automatically based on prior settings.

The system can include sensors positioned within the vehicle to identify an individual who has entered through the driver's door of the vehicle. In at least one embodiment, the system includes sensors in the driver's seat to measure the weight of the individual and/or the placement of sitting bones on the driver's seat. Sensors can also be positioned in the steering wheel to identify hand placement and/or measure the grip force on the steering wheel. In another embodiment, sensors are placed in the vehicle to measure the weight of the keys in the vehicle ignition, interaction with the interior climate controls, and/or vehicle entry behavior, such as force applied to different elements of the vehicle and interaction with storage compartments.

Figure 1A:
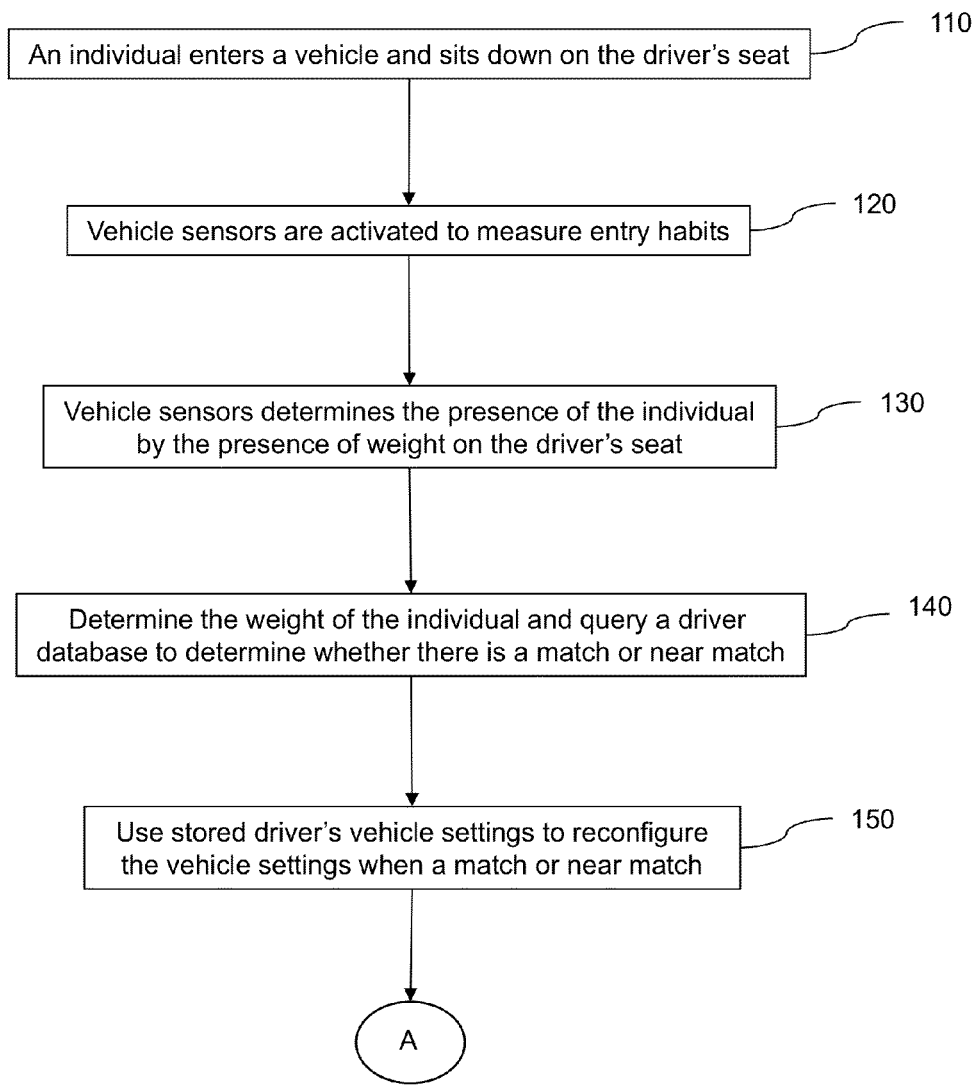
FIGS. 1A and 1B are flow diagrams illustrating a method for detecting driver persona in a vehicle according to an embodiment of the invention.
Figure 1B:
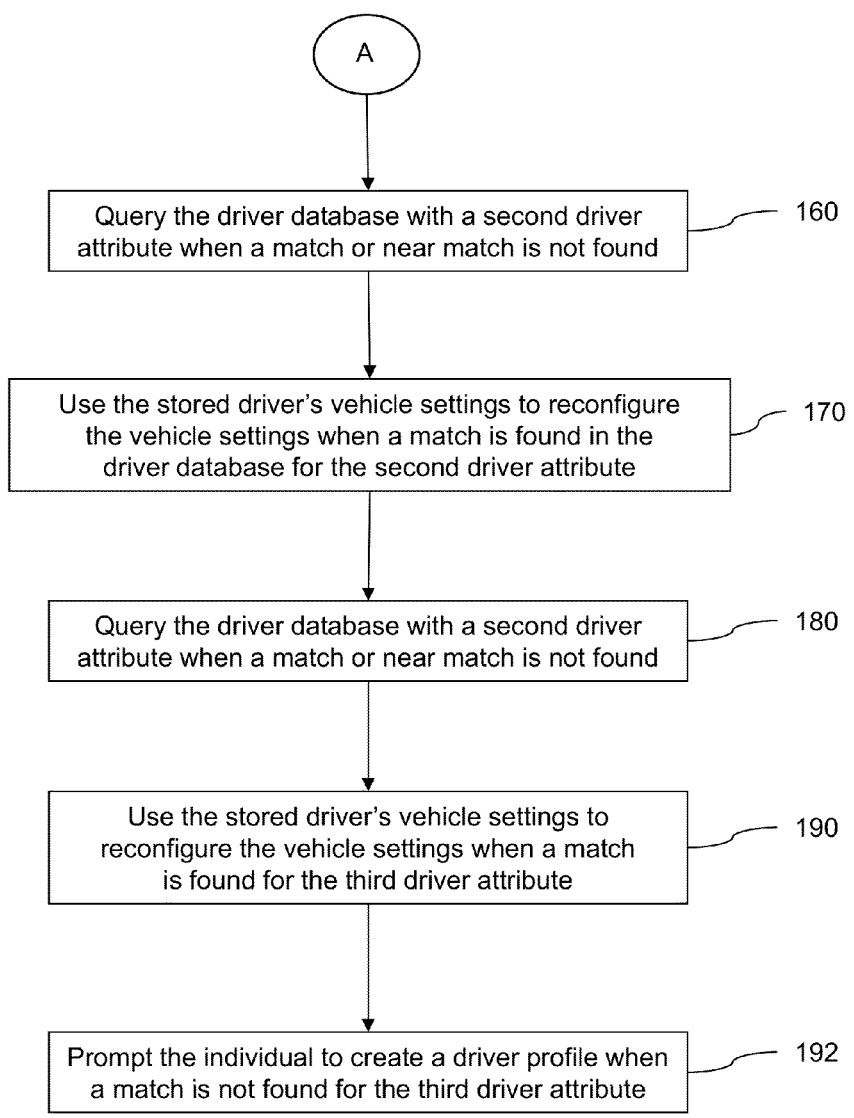

FIGS. 1A and 1B are flow diagrams illustrating a method for detecting driver persona in a vehicle according to an embodiment of the invention. An individual (also referred to herein as a "driver" or "user") enters a vehicle and sits down on the driver's seat 110. A system includes car sensors that are activated to measure entry habits 120, such as placement of one or both feet on the driver's floor mat, driver's seat cushion imprint, hand placement and/or force on steering wheel, adjustment of the rearview and/or side mirrors, interaction with cup holders and/or storage compartments (i.e., glove box, center console, door pockets), etc. In at least one embodiment, the sensors identify a driver's sequence of activities to identify a pattern, e.g., seat belt fastened first, foot placed on the brake second, key inserted into the ignition third, etc. In at least one embodiment, the sequence of activities includes the sequence in which the user adjusts a horizontal seat position, a vertical seat position, a rear view mirror position, a driver-side mirror position, a passenger-side mirror position, a steering wheel position, a climate control mode setting (e.g., cool, heat, fan), a temperature setting (i.e., thermostat), a fan setting (e.g., high, medium, low), a seat warmer setting, a seat cooler setting, a windshield defroster setting, a rear window defroster setting, a radio volume setting, a radio station setting, a radio mode setting (e.g., CD, MP3, auxiliary, satellite radio, terrestrial radio, internet radio), navigation settings, and/or wireless connectivity settings.

The system determines the presence of a driver by the presence of weight on the driver's seat 130. The system determines the weight of the person in the driver's seat and queries a driver database to determine whether there is a match or near match (e.g., plus or minus 5 pounds) between the measured weight and a stored weight for a driver 140. In at least one embodiment, the driver database includes driver profiles, where each driver profile includes the driver's attributes (e.g., weight, sitting bones print, vehicle entry behavior) and the driver's vehicle settings. As used herein, the term "vehicle settings" includes vehicle settings preferences that were set by a driver when he or she created a driver profile, the vehicle settings that were set the last time the driver changed the vehicle settings, and/or the vehicle settings that were set the last time the driver drove the vehicle (even though the driver did not change the settings).

If a match or near match is found in the driver database for the measured weight, then the stored driver's vehicle settings are used to reconfigure the vehicle settings 150. If a match or near match is not found in the driver database for the measured weight, then the driver database is queried with a second driver attribute (e.g., distance between the sitting bones) 160. If a match is found in the driver database for the second driver attribute, then the stored driver's vehicle settings are used to reconfigure the vehicle settings 170.

If a match for the second driver attribute is not found in the driver database, then the driver database is queried with a third driver attribute (e.g., entry habits) 180. If a match is found in the driver database for the third driver attribute, then the stored driver's vehicle settings are used to reconfigure the vehicle settings 190. If a match is not found for the third driver attribute, then the individual is prompted by the system to create a driver profile 192. In another embodiment, the individual is not prompted to create a driver profile, wherein a new driver profile is automatically created when a match is not found in the driver database.

In at least one embodiment of the invention, the system accounts for fluctuations in the driver's weight by creating a log or history of the driver's weight and allowing for certain tolerances. Such tolerances can be trended up or down to keep an accurate changing profile of the driver. For example, a near match weight threshold is set for plus or minus 5 pounds and Driver A's profile has a weight of 150 pounds in week 1, 152 pounds in week 2, 153 pounds in week 3, 155 pounds in week 4, and 156 pounds in week 5. Although Driver A's weight is 5 pounds over the weight recorded in his profile, the system tolerates Driver A's weight gain over time; and as such, the 156 lb individual on week 5 is recognized as Driver A. The decision of whether or not to allow the system to tolerate for fluctuations in weight may depend on whether other drivers of the vehicle are close in weight. In another embodiment of the invention, the system can be deactivated by the user so that saved driver settings are not automatically set for a new driver, such as a valet driver.

Figure 2:
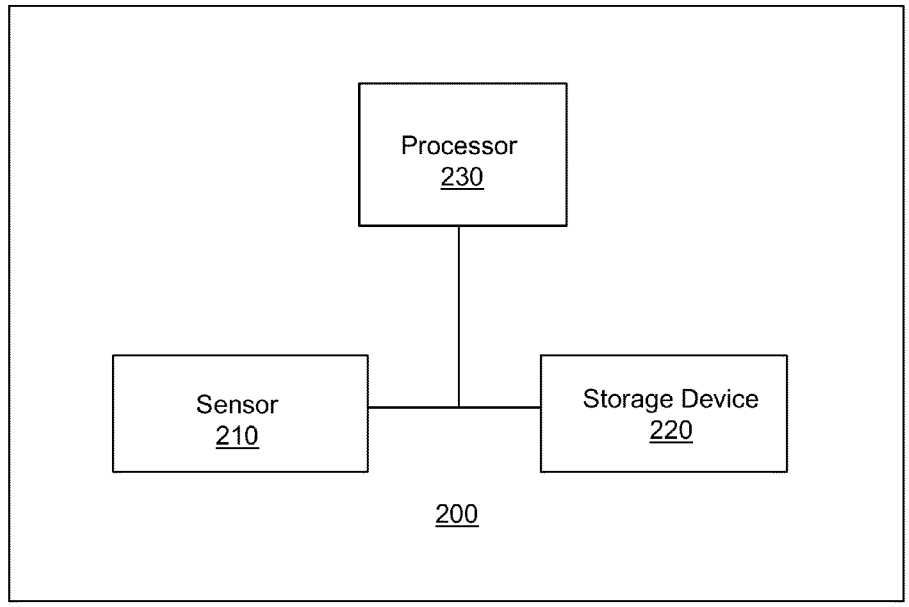
FIG. 2 is a diagram illustrating a system for detecting driver persona in a vehicle according to an embodiment of the invention.
Figure 3:
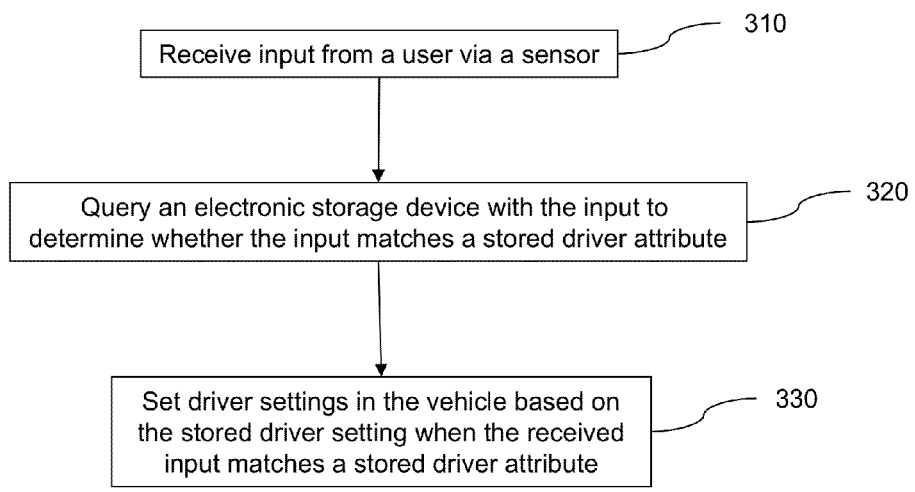
FIG. 3 is a flow diagram illustrating a method for detecting driver persona in a vehicle according to an embodiment of the invention.

FIG. 2 is a diagram illustrating a system 200 for detecting driver persona in a vehicle according to an embodiment of the invention, wherein the system 200 includes one or more sensors 210, an electronic storage device 220, and a processor 230. FIG. 3 is a flow diagram illustrating a method for detecting driver persona in a vehicle according to an embodiment of the invention, for example, using the system 200.

Figure 4:
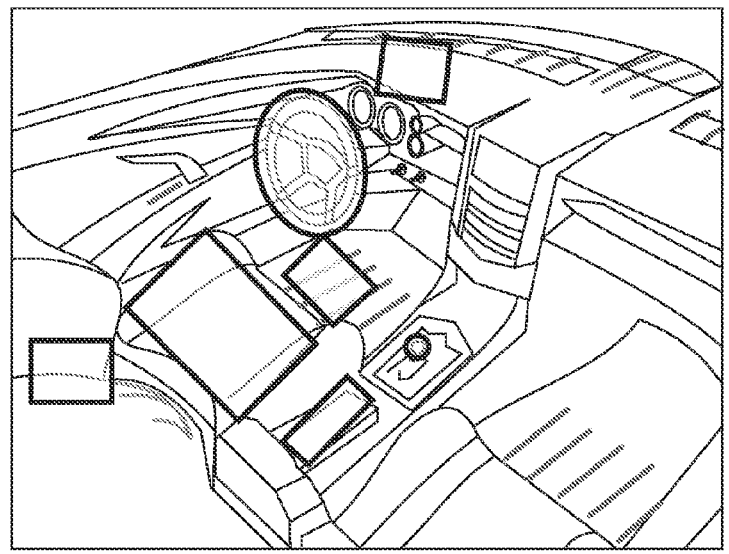
FIG. 4 is a diagram illustrating a vehicle cockpit having sensors according to an embodiment of the invention.
Figure 5:
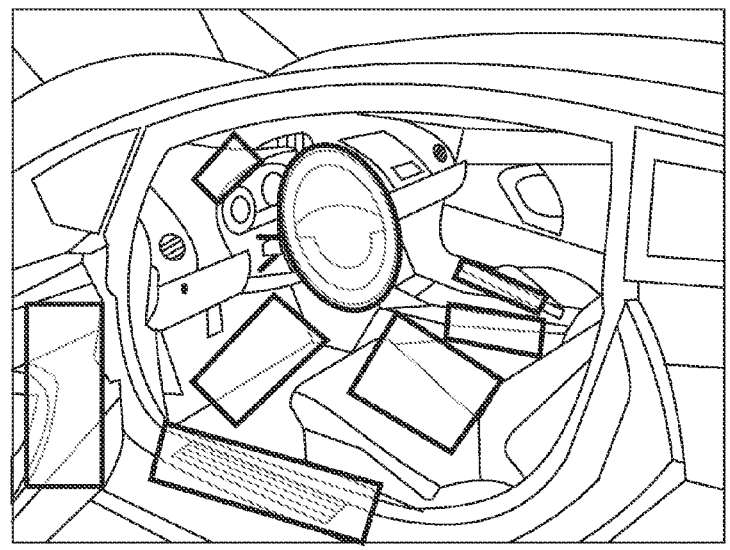
FIG. 5 is a diagram illustrating a vehicle cockpit having sensors according to another embodiment of the invention.

Input is received from a user via at least one of the sensors 210, wherein the input includes an attribute of the user (310). As used herein, the term "sensors" includes hardware devices positioned within the interior of a vehicle for measuring pressure, light, and/or sound. FIGS. 4 and 5 illustrate example positions within a vehicle cockpit that can include sensors, such as, the driver's seat, driver's floor mat, steering wheel, parking break, gear shifter, driver's door handle, etc.

In at least one embodiment, an attribute of the user is identified as input via a sensor 210. The input can include an individual's body weight, fingerprint, voice print, retina, hand placement on the steering wheel, steering wheel grip force, foot placement, interior climate settings (air conditioner, heater, seat warmers, and/or seat air conditioners), and/or the weight of the keys connected to the vehicle's ignition, which can include charms, chains, clips, and other items attached to the keys. The input can also include the individual's interaction with storage compartments and/or vehicle entry behavior, i.e., the pressure applied to different elements of the vehicle (e.g., mirrors, sunshades, various buttons, etc.) and/or the sequence of activities performed by a driver when entering the vehicle (after the driver's door is opened). For example, the input from the sensor 210 can include the following driver entry sequence: (1) floor mat contact; (2) seat contact; (3) glove box contact; and (4) sunshade contact. In another embodiment, the sensors 210 measure an individual's sitting bones print (e.g., distance between sitting bones on the driver's seat).

The processor 230 queries the electronic storage device 220 with the received input (i.e., user attribute) to determine whether the received input matches one or more stored driver attributes (320). The electronic storage device 220 includes one or more driver profiles, wherein each driver profile includes at least one driver attribute (e.g., weight) and stored driver settings. The stored driver attribute can also include the driver's voice print, retinal scan, fingerprint(s), steering wheel hand placement, steering wheel grip force, foot placement, weight of keys, interior climate settings, vehicle entry behavior, interaction with storage compartments, sitting bones print.

In at least one embodiment, the stored driver attribute includes the sequence of activities performed by the driver when entering the vehicle. In another embodiment, an electronic log of the driver's weight over time is created; and, an average weight of the driver over a predetermined time interval (e.g., 4 weeks) is calculated. The average weight of the driver is compared to a near match weight threshold (e.g., 6 pounds) to determine whether the average weight of the driver is within the near match weight threshold. The average weight of the driver is trended over time, wherein the associated attribute is adjusted to keep an accurate changing profile of the driver. The user is identified as the driver when the average weight of the driver is within the near match weight threshold.

The processor 230 sets driver settings in the vehicle based on the stored driver settings when the received input matches a stored driver attribute in the electronic storage device 210 (330). As used herein, the term "processor" includes a hardware computer device (programmed to perform at least one method according to the invention) connected to the sensors 210 and electronic storage device 220. The processor 230 automatically sets the driver settings in the vehicle without an explicit command from the user (e.g., voice command, actuation of buttons, levers, knobs, etc.).

The stored driver settings can include seat position (e.g., up/down, forward/backward, recline), rear view mirror position, side mirrors position, steering wheel position (e.g., tilt or telescoping position), temperature (e.g., heater, AC, seat warmers, seat coolers), defroster setting, radio setting (e.g., volume, station, pre-set stations, source (e.g., internet, external media player), CD, etc.), navigation settings (e.g., home, recent destinations, display settings, route preferences), wireless connectivity (e.g., Bluetooth) settings, and/or airbag settings (e.g., deactivation of passenger and/or side airbags). In at least one embodiment, the stored driver settings are pre-programmed driver setting preferences that are selected by the driver. In another embodiment, the stored driver settings are not pre-programmed; and, the processor 230 uses the driver settings that were employed the last time the vehicle was operated by the driver. In yet another embodiment, the processor 230 uses the driver settings that were employed the last time the driver changed a driver setting.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
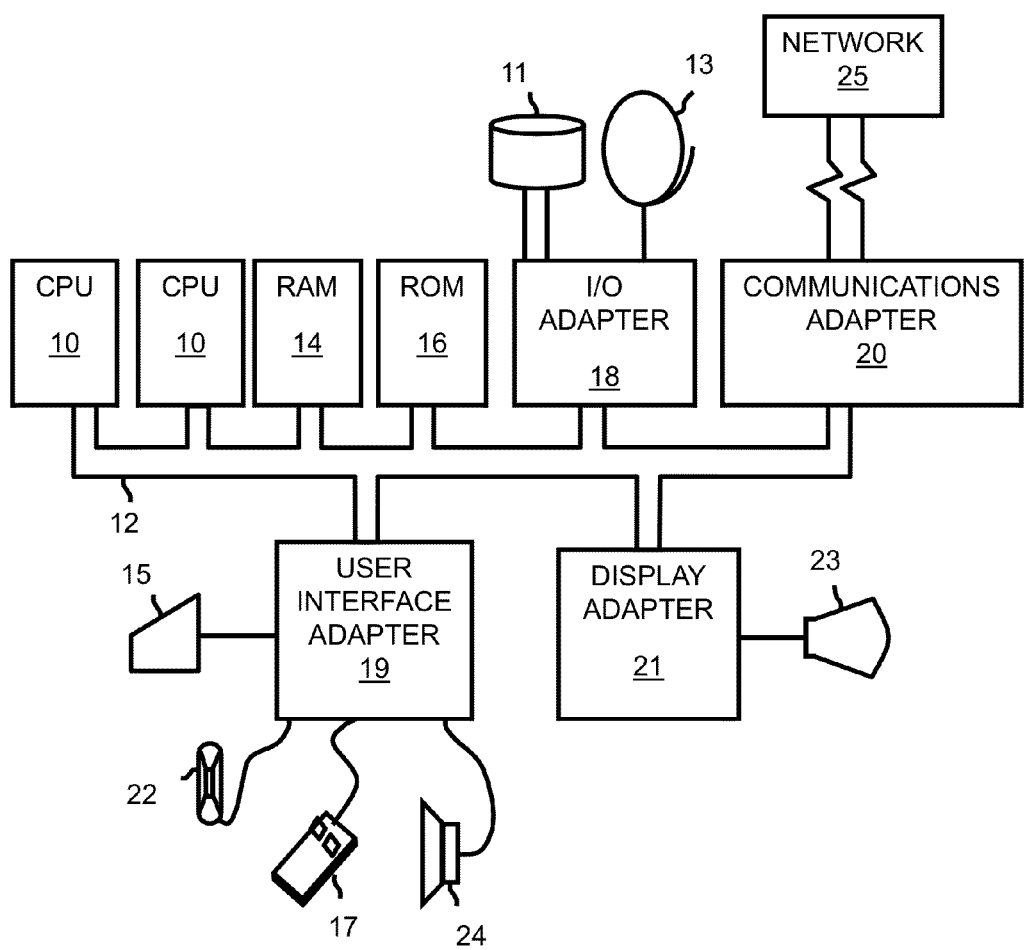
FIG. 6 illustrates a computer program product according to an embodiment of the invention.

Referring now to FIG. 6, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 10. The CPUs 10 are interconnected with system bus 12 to various devices such as a random access memory (RAM) 14, read-only memory (ROM) 16, and an input/output (I/O) adapter 18. The I/O adapter 18 can connect to peripheral devices, such as disk units 12 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    identifying an attribute of a user via at least one sensor in an interior of a vehicle, the attribute of the user including a body weight of the user;
    creating an electronic log of the driver's weight over time;
    calculating an average weight of the driver over a predetermined time interval;
    comparing the average weight of the driver to a near match weight threshold to determine whether the average weight of the driver is within the near match weight threshold;
    identifying the user as the driver when the average weight of the driver is within the near match weight threshold;
    querying an electronic storage device with the attribute of the user to determine whether the attribute of the user matches at least one stored driver attribute, the electronic storage device including at least one driver profile including at least one driver attribute and stored driver settings; and
    setting driver settings in the vehicle with a processor based on the stored driver settings when the attribute of the user matches a stored driver attribute in the electronic storage device.

2. The method according to claim 1, wherein the stored driver settings include at least one of a seat position, a rear view mirror position, a side mirror position, a steering wheel position, a temperature setting, a defroster setting, a radio setting, navigation settings, wireless connectivity settings, and airbag settings.

3. The method according to claim 1, wherein the stored driver settings include a seat position, a rear view mirror position, a side mirror position, a steering wheel position, a temperature setting, a radio setting, navigation settings, and wireless connectivity settings.

4. The method according to claim 1, wherein the stored driver attribute includes a driver's sitting bones print.

5. The method according to claim 1, wherein the attribute of the user further includes a sequence of activities performed by the user when entering the vehicle.

6. The method according to claim 1, wherein the sequence of activities includes a sequence in which the user adjusts at least two of a horizontal seat position, a vertical seat position, a rear view mirror position, a driver-side mirror position, a passenger-side mirror position, a steering wheel position, a climate control mode setting, a temperature setting, a fan setting, a seat warmer setting, a seat cooler setting, a windshield defroster setting, a rear window defroster setting, a radio volume setting, a radio station setting, a radio mode, navigation settings, and wireless connectivity settings.

7. The method according to claim 1, wherein the sequence of activities includes a sequence in which the user adjusts at least five of a horizontal seat position, a vertical seat position, a rear view mirror position, a driver-side mirror position, a passenger-side mirror position, a steering wheel position, a climate control mode setting, a temperature setting, a fan setting, a seat warmer setting, a seat cooler setting, a windshield defroster setting, a rear window defroster setting, a radio volume setting, a radio station setting, a radio mode setting, navigation settings, and wireless connectivity settings.

8. The method according to claim 1, wherein the stored driver attribute includes at least one of steering wheel grip force, foot placement, weight of keys, and interior climate settings.

9. The method according to claim 1, wherein the attribute of the user further includes steering wheel hand placement, steering wheel grip force, foot placement, weight of keys, and interior climate settings.

10. The method according to claim 1, wherein the stored driver settings include at least one of:
    pre-programmed driver setting preferences selected by a driver,
    driver settings that were employed the last time the vehicle was operated by the driver, and
    driver settings that were employed the last time the driver changed a driver setting.

11. The method according to claim 1, wherein the stored driver settings include navigation settings and wireless connectivity settings, wherein the navigation settings include home, recent destinations, display settings, and route preferences, and wherein the wireless connectivity settings include Bluetooth settings.

12. The method according to claim 1, wherein the driver's sitting bones print include a distance between sitting bones on the driver's seat.

13. A system comprising:
    a sensor in an interior of a vehicle, said sensor identifies an attribute of the user, the attribute of the user including a sequence of activities performed by the user when entering the vehicle;
    an electronic storage device connected to said sensor, said electronic storage device including at least one driver profile including at least one driver attribute and stored driver settings; and
    a processor connected to said electronic storage device, said processor queries said electronic storage device with the attribute of the user to determine whether the attribute of the user matches at least one stored driver attribute, said processor sets driver settings in the vehicle based on the stored driver settings when the attribute of the user matches a stored driver attribute in said electronic storage device, said processor:
        creates an electronic log of the driver's weight over time;
        calculates an average weight of the driver over a predetermined time interval:
        compares the average weight of the driver to a near match weight threshold to determine whether the average weight of the driver is within the near match weight threshold; and
        identifies the user as the driver when the average weight of the driver is within the near match weight threshold.

14. The system according to claim 13, wherein the stored driver settings include at least one of a seat position, a rear view mirror position, a side mirror position, a steering wheel position, a temperature setting, a defrost setting, a radio setting, navigation settings, wireless connectivity settings, and airbag settings.

15. The system according to claim 13, wherein the stored driver attribute includes a driver's body weight.

16. The system according to claim 13, wherein the stored driver attribute includes a driver's sitting bones print.

17. The system according to claim 13, wherein the sequence of activities includes a sequence in which the user adjusts at least two of a horizontal seat position, a vertical seat position, a rear view mirror position, a driver-side mirror position, a passenger-side mirror position, a steering wheel position, a climate control mode setting, a temperature setting, a fan setting, a seat warmer setting, a seat cooler setting, a windshield defroster setting, a rear window defroster setting, a radio volume setting, a radio station setting, a radio mode setting, navigation settings, and wireless connectivity settings.

18. The system according to claim 13, wherein the stored driver attribute includes at least one of steering wheel grip force, foot placement, weight of keys, interior climate settings, and interaction with storage compartments.

19. The system according to claim 13, wherein the stored driver settings include at least one of:
  pre-programmed driver setting preferences selected by a driver,
  driver settings that were employed the last time the vehicle was operated by the driver,
  and
  driver settings that were employed the last time the driver changed a driver setting.

20. A computer program product comprising:
a non-transitory computer readable storage medium;
first program instructions to identify an attribute of a user, the attribute of the user including a body weight of the user;
second program instructions to create an electronic log of the driver's weight over time:
third program instructions to calculate an average weight of the driver over a predetermined time interval;
fourth program instructions to compare the average weight of the driver to a near match weight threshold to determine whether the average weight of the driver is within the near match weight threshold;
fifth program instructions to identify the user as the driver when the average weight of the driver is within the near match weight threshold;
sixth program instructions to query an electronic storage device with the attribute of the user to determine whether the attribute of the user matches at least one stored driver attribute, the electronic storage device including at least one driver profile including at least one driver attribute and stored driver settings; and
seventh program instructions to set driver settings in the vehicle based on the stored driver settings when the attribute of the user matches a stored driver attribute in the electronic storage device,
said first program instructions, said second program instructions, said third program instructions, said fourth program instructions, said fifth program instructions, said sixth program instructions, and said seventh program instructions are stored on said computer readable storage medium.

* * * * *